United States Patent
Nio

(10) Patent No.: US 7,639,434 B2
(45) Date of Patent: Dec. 29, 2009

(54) IMAGING LENS

(75) Inventor: Junichi Nio, Chiba (JP)

(73) Assignee: Seiko Precision Inc., Chiba (JP)

( * ) Notice: Subject to any disclaimer, the term of this patent is extended or adjusted under 35 U.S.C. 154(b) by 45 days.

(21) Appl. No.: 12/109,322

(22) Filed: Apr. 24, 2008

(65) Prior Publication Data

US 2008/0266679 A1  Oct. 30, 2008

(30) Foreign Application Priority Data

Apr. 27, 2007  (JP) ............................. 2007-118433

(51) Int. Cl.
*G02B 9/12* (2006.01)
*G02B 3/02* (2006.01)
(52) U.S. Cl. ...................................... 359/791; 359/717
(58) Field of Classification Search ................. 359/717, 359/791, 796, 797
See application file for complete search history.

(56) References Cited

U.S. PATENT DOCUMENTS 6,970,306 B2 * 11/2005 Matsuo ........................ 359/716
7,064,905 B2 * 6/2006 Murakami et al. ........... 359/784
7,099,092 B2 * 8/2006 Sato ............................. 359/791
7,180,687 B2 * 2/2007 Sato ............................. 359/791

FOREIGN PATENT DOCUMENTS

JP  2006-308789 A  11/2006

* cited by examiner

*Primary Examiner*—David N Spector
(74) *Attorney, Agent, or Firm*—Townsend and Townsend and Crew LLP

(57) ABSTRACT

An imaging lens has a compact shape and sufficiently compensates for various aberrations.

The imaging lens includes a first lens, a second lens, and a third lens disposed sequentially, with the first lens toward an object. The conditions "0.5H<T0<0.7H," "2<φr4/φ<2.5," and "0.15<φr5/φ<0.3" are satisfied, where: H is the effective radius of the surface of the third lens facing an image surface; T0 is the distance between the optical axis and a point on a line parallel to the optical axis and normal to the surface of the third lens facing the image surface; φ is the combined refractive power of the imaging lens; φr4 is the refractive power of the surface of the second lens facing the image surface; and φr5 is the refractive power of the surface of the third lens facing the object.

3 Claims, 9 Drawing Sheets

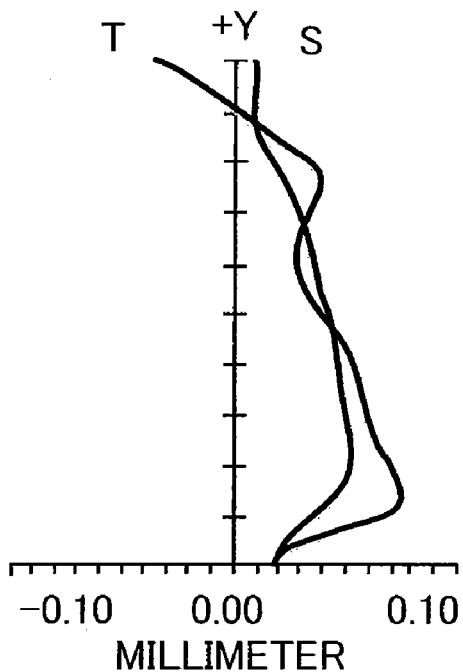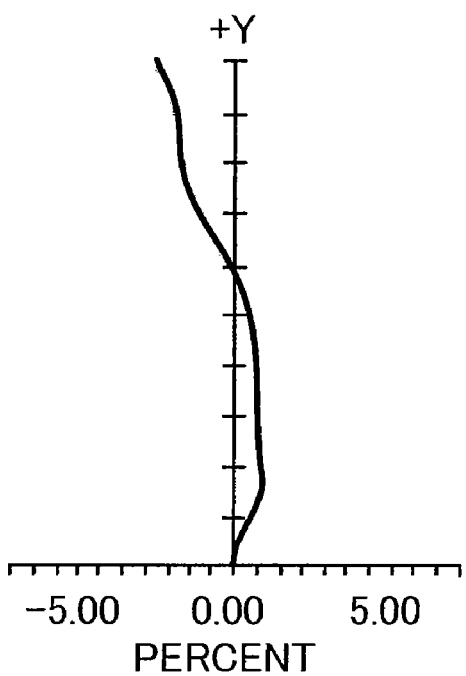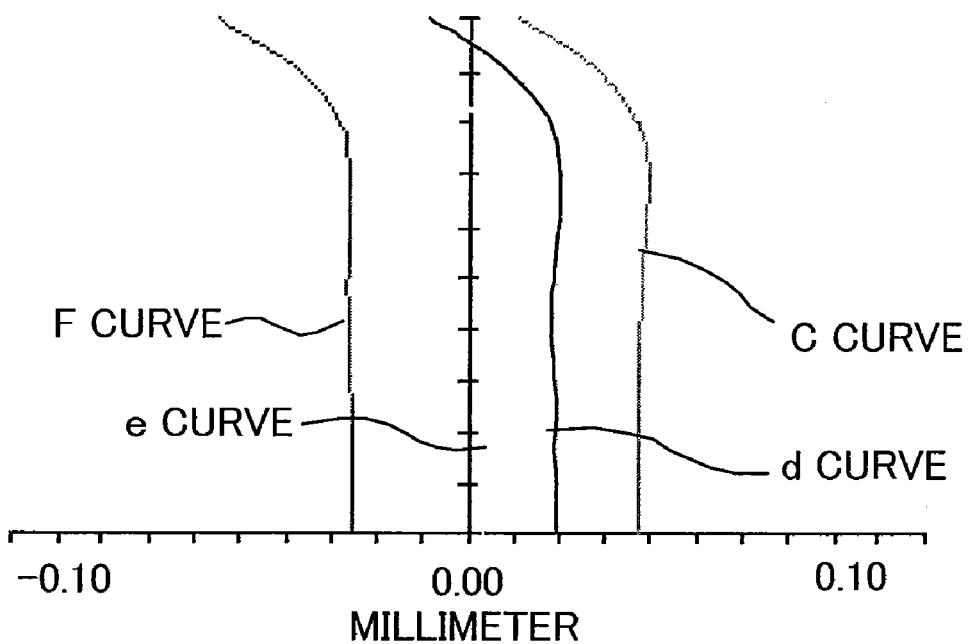

FIELD CURVATURE

DISTORTION

PUPIL RADIUS : 0.5210 MILLIMETERS

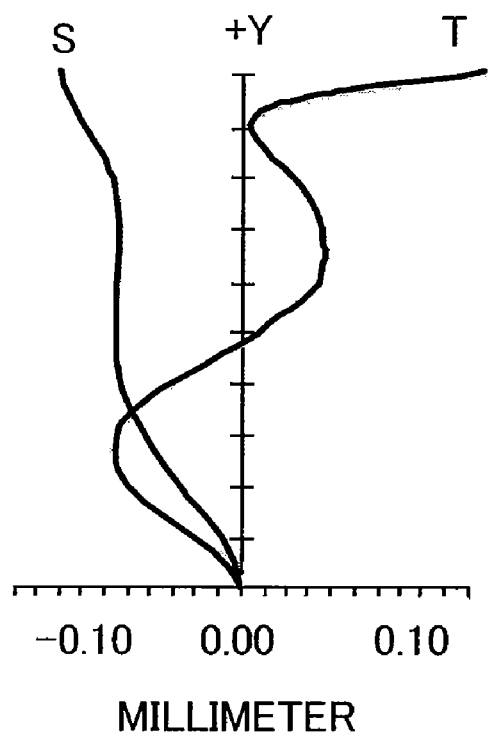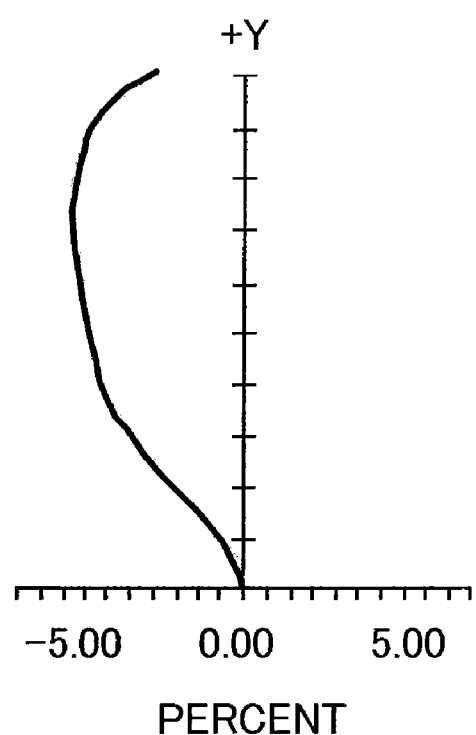

FIELD CURVATURE

DISTORTION

IMAGING LENS

BACKGROUND OF THE INVENTION

1. Field of the Invention

The present invention relates to a compound imaging lens including three lens elements.

2. Description of the Related Art

In recent years, the advancement of miniature solid-state image sensors for mobile cameras mounted in applications such as mobile phones has resulted in the use of solid-state image sensors having pixels 3 μm or smaller in size. An imaging lens requires three or more lens elements to practically accommodate solid-state image sensors of such extremely small pixel sizes. Such optical systems require corrections to sufficiently compensate for various aberrations.

Unexamined Japanese Patent Application KOKAI Publication No. 2006-308789 discusses a known example of an imaging device using three lens elements.

However, the imaging lens discussed in the Unexamined Japanese Patent Application KOKAI Publication recited above has insufficient aberration compensation, resulting in a large astigmatism of about 0.1 mm. This aberration unfortunately requires further compensation for use in a camera having a high quality image sensor.

The present invention was accomplished in consideration of the problems recited above and is directed to provide an imaging lens that has three lens elements, achieves a compact size, and adequately compensates for various aberrations.

SUMMARY OF THE INVENTION

To accomplish the objects recited above, a compound lens of the present invention includes:

a first lens, a second lens, and a third lens disposed sequentially in this order, the first lens disposed toward an object, and the third lens disposed toward an image surface; wherein the first lens has a meniscus shape, a positive refraction, and a convex surface, the convex surface facing the object;

the second lens has a meniscus shape, a positive refraction, and a concave surface, the concave surface facing the object;

the third lens has a convex-type shape facing the object, and a concave-type aspherical shape facing the image surface, the concave-type aspherical shape configured to provide a negative refraction in a radially central portion and a positive refraction in a radially peripheral portion; and three conditions:

$$0.5H<T0<0.7H \quad (1)$$

$$2<\phi r4/\phi<2.5 \quad (2)$$

and $$0.15<\phi r5/\phi<0.3 \quad (3)$$

are satisfied, where

H is defined as the effective radius of the surface of the third lens facing the image surface, T0 is defined as a distance between a point on a normal line and the optical axis, the normal line being parallel to the optical axis and normal to the surface of the third lens facing the image surface, $\phi$ is defined as the combined refractive power of the first lens, the second lens, and the third lens, $\phi r4$ is defined as the refractive power of a surface of the second lens facing the image surface, and $\phi r5$ is defined as a refractive power of the surface of the third lens facing the object.

The present invention may, for example, include an aperture stop disposed between the first lens and the second lens. The conditions:

$$0.8<\phi 1/\phi<1 \quad (4)$$

and $$0.8 \leq t3/(t2+t3) \quad (5)$$

may, for example, be satisfied, where $\phi 1$ is the refractive power of the first lens, t2 is the distance between the first lens and the aperture stop, and t3 is the distance between the aperture stop and the second lens.

BRIEF DESCRIPTION OF THE DRAWINGS

These objects and other objects and advantages of the present invention will become more apparent upon reading of the following detailed description and the accompanying drawings in which:

FIGS. 3A through 3C illustrate various aberrations of the imaging lens according to the first exemplary embodiment.

FIGS. 7A and 7B illustrate various aberrations of the imaging lens according to the first comparative example, having a T0 value below the lower limit in condition (1).

DETAILED DESCRIPTION OF THE PREFERRED EMBODIMENTS

Two particular exemplary embodiments are presented to illustrate possible implementations of the present invention.

Figure 1:
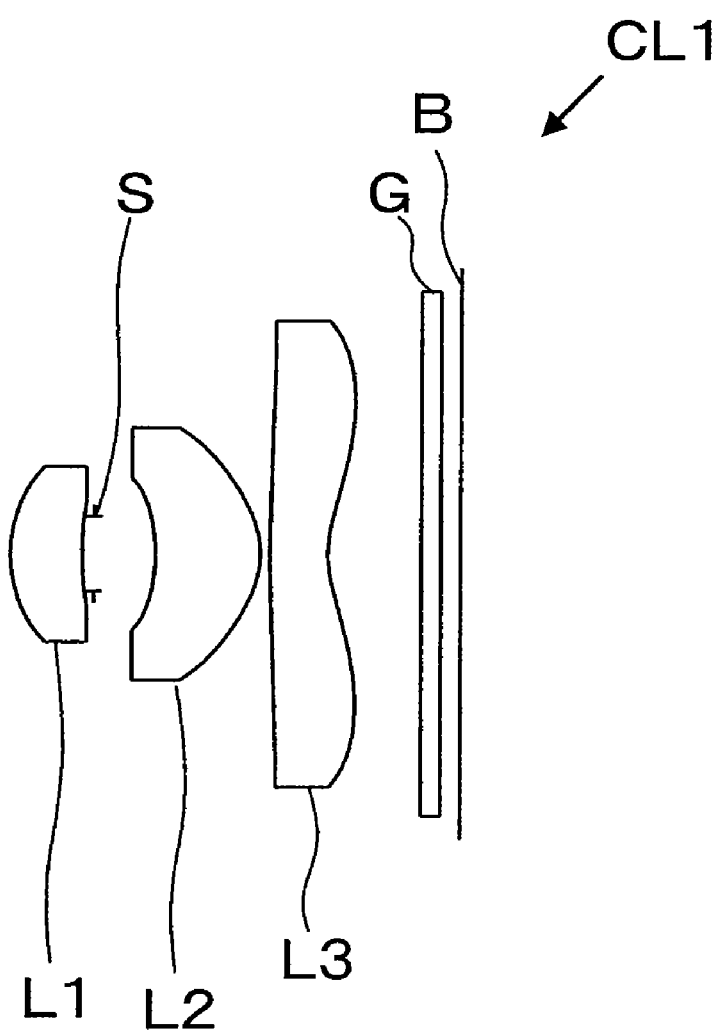
FIG. 1 illustrates a lens configuration of an imaging lens according to a first exemplary embodiment.
Figure 2:
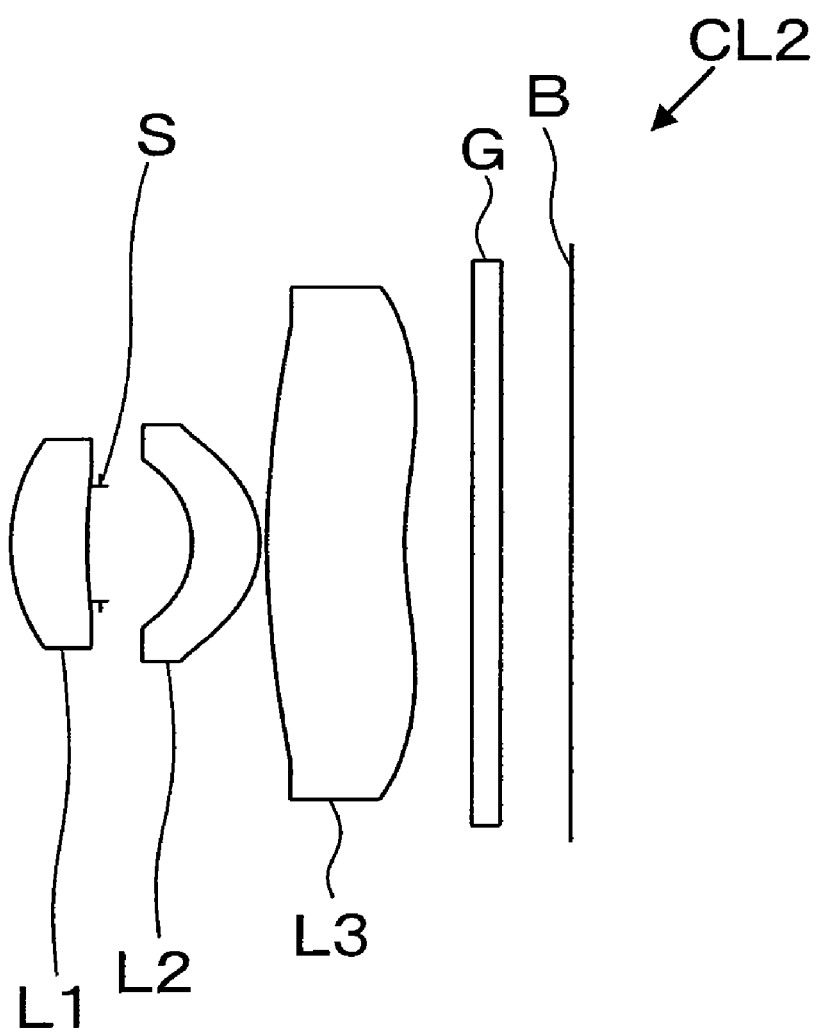
FIG. 2 illustrates a lens configuration of an imaging lens according to a second exemplary embodiment.

FIG. 1 and FIG. 2 illustrate configurations of imaging lenses CL1 and CL2 according to a first and a second exemplary embodiment, respectively, of the present invention. The imaging lenses CL1 and CL2 have similar basic configurations and design conditions, and differ only by shape. Hereinafter follows a description of the configuration and design conditions common to the imaging lenses CL1 and CL2, after which follows a description of the shapes and properties of each individual imaging lens CL1 and CL2.

[Basic Configuration]

The imaging lenses CL1 and CL2 each include three lens elements as illustrated in FIG. 1 and FIG. 2. For convenience, the lens elements are referred to hereinafter as the first lens L1, the second lens L2, and the third lens L3. The first lens L1 is disposed closest to the object to be imaged (not illustrated; hereinafter referred to as "the object"), and the third lens L3 is disposed farthest from the object.

The first lens L1 is a positive meniscus lens, arranged with a convex surface facing the object. The second lens L2 is a positive meniscus lens, arranged with a concave surface facing the object. The third lens L3 has a convex-type surface facing the object and a concave-type aspherical surface facing the image surface. The concave-type aspherical surface is configured to provide a negative refraction in a radially central portion and a positive refraction in a radially peripheral portion.

An aperture stop S is disposed between the first lens L1 and the second lens L2. A parallel flat plate glass G is disposed between the third lens L3 and the image surface B. The parallel flat plate glass G corresponds to a filter and a cover glass.

[Design Conditions]

The imaging lenses CL1 and CL2 presented in Table 1 are designed to satisfy conditions (1) through (5) recited below.

TABLE 1

|  | CL1(embodiment 1) | CL2(embodiment 2) | Description |
| --- | --- | --- | --- |
| T0 | 0.66H | 0.52H | condition(1) |
| φr4/φ | 2.21 | 2.25 | condition(2) |
| φr5/φ | 0.18 | 0.28 | condition(3) |
| φ1/φ | 0.88 | 0.91 | condition(4) |
| t3/(t2 + t3) | 0.838 | 0.885 | condition(5) |

The conditions for lens design include:

$$0.5H < T0 < 0.7H \quad (1)$$

$$2 < \phi r4/\phi < 2.5 \quad (2)$$

$$0.15 < \phi r5/\phi < 0.3 \quad (3)$$

$$0.8 < \phi 1/\phi < 1 \quad (4)$$

and $$0.8 \leq t3/(t2+t3) \quad (5)$$

where

H is the effective radius of the surface of the third lens L3 facing the image surface, T0 is the distance between a point on a normal line and the optical axis, the normal line being parallel to the optical axis and normal to the surface of the third lens L3 facing the image surface, φ is the combined refractive power of the first lens L1, the second lens L2, and the third lens L3, φr4 is the refractive power of the surface of the second lens L2 facing the image surface, φr5 is the refractive power of the surface of the third lens L3 facing the object, φ1 is the refractive power of the first lens L1, t2 is the distance between the first lens L1 and the aperture stop S, and t3 is the distance between the aperture stop S and the second lens L2.

A value of T0 below the lower limit of condition (1) results in a shape of the third lens L3 facing the image surface wherein the positive refraction of the radially peripheral portion of the lens surface becomes too strong. In such a configuration, compensation for astigmatism and distortion becomes difficult. Conversely, a value of T0 above the upper limit of condition (1) results in a shape of the third lens L3 facing the image surface wherein the radially peripheral portion of the lens surface becomes too close to the image surface B. In such a configuration, the back focal distance becomes shorter, causing difficulties placing an infrared cut filter and cover glass for the imaging sensor between the lens and the image surface.

A value of φr4/φ below the lower limit of condition (2) results in too weak a refraction of the surface of the second lens L2 facing the image surface. In such a configuration, the total length of the imaging lenses CL1 and CL2 increases, and therefore a compact design becomes difficult to achieve. Conversely, a value of φr4/φ above the upper limit of condition (2) results in too strong a refraction of the surface of the second lens L2 facing the image surface. In such a configuration, compensation for astigmatism and coma of the third lens L3 becomes difficult.

A value of φr5/φ below the lower limit of condition (3) results in too weak a refraction of the surface of the third lens L3 facing the object. In such a configuration, the total length of the imaging lenses CL1 and CL2 increases, and therefore a compact design becomes difficult to achieve. Conversely, a value of φr5/φ above the upper limit of condition (3) results in too strong a refraction of the surface of the third lens L3 facing the object. In such a configuration, the back focal distance becomes shorter, causing difficulties placing an infrared cut filter and cover glass for the imaging sensor between the lens and the image surface.

A value of φ1/φ below the lower limit of condition (4) results in too weak a refraction of the first lens L1. In such a configuration, the total length of the imaging lenses CL1 and CL2 increases, and therefore a compact design becomes difficult to achieve. Conversely, a value of φ1/φ above the upper limit of condition (4) results in too strong a refraction of the first lens L1. In such a condition, spherical aberration, astigmatism, and coma become large, making it difficult for the second lens L2 and the third lens L3 to compensate for these various aberrations.

A value of t3/(t2+t3) below the lower limit of condition (5) indicates that the aperture stop is positioned too close to the image surface, resulting in a short distance of the exit pupil from the focal plane. In such a configuration, the incident angle to the image surface becomes large, thereby decreasing the amount of light incident on the image sensor.

First Exemplary Embodiment

The data defining lens elements of an imaging lens CL1 according to a first exemplary embodiment is presented in Table 2. In Table 2, "curvature radius r" is defined as the curvature radius of each lens surface; "distance d" is defined as the distance from the No. i surface (lens surface or element surface) to the No. i+1 surface; "refractive index nd" is the refractive index of the material at the wavelength of the Fraunhofer d curve (587.6 nm); and "Abbe number vd" is the Abbe number with respect to the d curve wavelength.

Hereinafter for brevity, "Fraunhofer line wavelength" may be referred to as "line," e.g., "Fraunhofer C curve wavelength" may be referred to as "C curve," etc.

TABLE 2

| No. | Curvature Radius r | Distance d | Refractive Index nd | Abbe Number vd | Description |
|---|---|---|---|---|---|
| 0 | 0 | Infinity | | | |
| 1 | 1.4524 | 0.766 | 1.53115 | 56.0 | first lens |
| 2 | 3.3600 | 0.127 | | | |
| 3 | 0 | 0.658 | | | aperture |
| 4 | −1.8728 | 1.122 | 1.53115 | 56.0 | second lens |
| 5 | −0.8953 | 0.1 | | | |
| 6 | 7.1165 | 0.615 | 1.53115 | 56.0 | third lens |
| 7 | 1.0889 | 1 | | | |
| 8 | 0 | 0.21 | 1.5168 | 64.2 | filter |
| 9 | 0 | 0.216 | | | |

The numbers (No.) in Table 2 refer to lens surfaces or element surfaces, numbered in ascending order beginning nearest to the object. For example, No. 1 is the lens surface of the lens L1 facing the object, No. 3 is the surface of the aperture stop S, etc.

To further define the lens shapes, coordinate axes are defined such that the optical axis of the imaging lens CL1 is the z axis, and the axis perpendicular to and intersecting the optical axis is the y axis. In the formula below, c is defined as the reciprocal of the curvature radius; k is the conic constant; and $\alpha_4, \alpha_6, \alpha_8, \alpha_{10}$, and $\alpha_{12}$ are asphericity coefficients. Then, the aspherical shape of each lens surface is given by:

[Formula 1]

$$z = \frac{cy^2}{1+\sqrt{1-(1+k)c^2y^2}} + \alpha_4 y^4 + \alpha_6 y^6 + \alpha_8 y^8 + \alpha_{10} y^{10} + \alpha_{12} y^{12} \quad (6)$$

The parameters defining the first lens L1 through the third lens L3 of the imaging lens CL1, i.e., a conic constant k and asphericity coefficients $\alpha_4, \alpha_6, \alpha_8, \alpha_{10}$, and $\alpha_{12}$, are listed in Table 3. The nomenclature of the numbers (No.) in Table 3 is the same as that of Table 2.

TABLE 3

| No. | k | α4 | α6 | α8 | α10 | α12 |
|---|---|---|---|---|---|---|
| 1 | 0.346889451 | 0.005340535 | −0.045126851 | 0.151381397 | −0.196389201 | 0.099656133 |
| 2 | −29.4165444 | 0.109254015 | 0.060822952 | 0.512455658 | −5.18967878 | 10.36793557 |
| 4 | −4.923733698 | −0.184459003 | 0.352152288 | −1.313661459 | 1.683044115 | −1.024494182 |
| 5 | −2.820739935 | −0.09187848 | 0.05649234 | −0.010880769 | −0.023985991 | 0.008807409 |
| 6 | −994.8568784 | 0 | 0 | 0 | 0 | 0 |
| 7 | −8.2173919 | −0.040875918 | 0.007431061 | −0.000618497 | −3.37756E−05 | 4.43502E−06 |

The focal distance f of the entire compound imaging lens CL1 is 3.728 mm, the F-number is f/3.6, and the angle of view 2ω is 67.2°. The imaging lens CL1 is defined also by a value of T0=0.66H in condition (1).

Aberrations of the imaging lens CL1 are illustrated in FIGS. 3A through 3C.

FIG. 3A is a graph of astigmatism of the imaging lens CL1, in which the "S" curve is the astigmatism (mm) in the saggittal plane at the d curve wavelength, and the "T" curve is the astigmatism (mm) in the tangential (meridional) plane at the d curve wavelength.

FIG. 3B is a graph of distortion (%) at the d curve wavelength for the imaging lens CL1.

FIG. 3C is a graph of spherical aberration of the imaging lens CL1, in which the d curve is the spherical aberration (mm) at the d curve wavelength (587.6 nm), the C curve is the spherical aberration (mm) at the C curve wavelength (656.3 nm), the e curve is the spherical aberration (mm) at the e curve wavelength (546.1 nm), and the F curve is the spherical aberration (mm) at the F curve wavelength (486.1 nm).

Second Exemplary Embodiment

The data defining lens elements of an imaging lens CL2 according to a second exemplary embodiment is presented in Table 4. The definitions of terms and numbers (No.) in Table 4 are the same as those in Table 2.

TABLE 4

| No. | Curvature Radius r | Distance d | Refractive Index nd | Abbe Number vd | Description |
|---|---|---|---|---|---|
| 0 | 0 | Infinity | | | |
| 1 | 1.2996 | 0.566 | 1.53115 | 56.0 | first lens |
| 2 | 4.1287 | 0.089 | | | |
| 3 | 0 | 0.684 | | | aperture |
| 4 | −0.6856 | 0.5 | 1.53115 | 56.0 | second lens |
| 5 | −0.7165 | 0.05 | | | |
| 6 | 3.7402 | 1.02 | 1.53115 | 56.0 | third lens |
| 7 | 2.3550 | 0.5 | | | |
| 8 | 0 | 0.21 | 1.5168 | 64.2 | filter |
| 9 | 0 | 0.523 | | | |

The parameters defining a first lens L1 through a third lens L3 of the imaging lens CL2, i.e., a conic constant k and asphericity coefficients $\alpha_4, \alpha_6, \alpha_8, \alpha_{10}$, and $\alpha_{12}$, are presented in Table 5. The numbers (No.) in Table 5 are the same as those in Table 4, and the definitions of the asphericity coefficients $\alpha_4, \alpha_6, \alpha_8, \alpha_{10}$, and $\alpha_{12}$ are the same as those of the imaging lens CL1.

TABLE 5

| No. | k | α4 | α6 | α8 | α10 | α12 |
|---|---|---|---|---|---|---|
| 1 | −0.321641671 | 0.019097874 | 0.105187067 | −0.365203735 | 0.662317131 | −0.480016954 |
| 2 | 48.31222223 | −0.018860323 | −1.114824549 | 5.199353825 | −13.5674891 | 6.207315211 |
| 4 | −5.275313109 | −1.909050225 | 3.103248952 | −4.822505271 | 0.907632931 | 5.971289088 |
| 5 | −0.471130805 | −0.06549842 | 0.138286132 | 0.069439663 | 0.020885035 | 0.460527642 |

TABLE 5-continued

| No. | k | α4 | α6 | α8 | α10 | α12 |
|---|---|---|---|---|---|---|
| 6 | −133.5881003 | 0.009966211 | 0.004927838 | −0.002830596 | 0.000387743 | −2.81799E−05 |
| 7 | −18.62564249 | −0.069563176 | 0.010500285 | −0.000153977 | −5.79976E−06 | −4.04022E−05 |

The focal distance f of the compound imaging lens CL2 is 3.035 mm, the F-number is f/2.9, and the angle of view 2ω is 72.2°. The imaging lens CL2 is defined also by a value of T0=0.52H in condition (1).

Figure 4A:
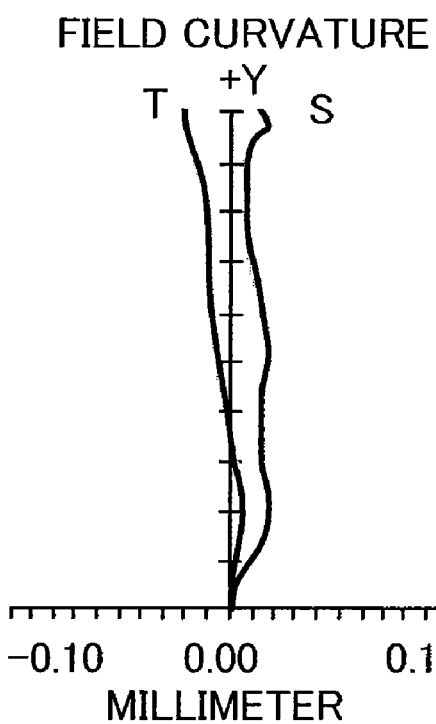
FIGS. 4A through 4C illustrate various aberrations of the imaging lens according to the second exemplary embodiment.
Figure 4B:
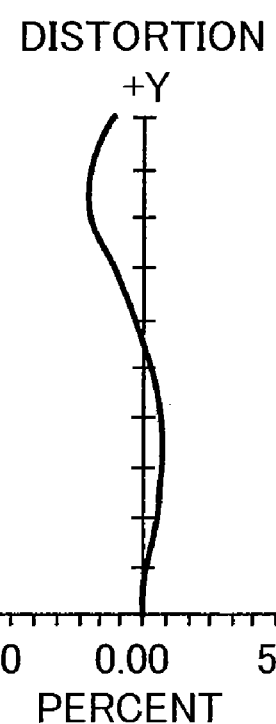
Figure 4C:
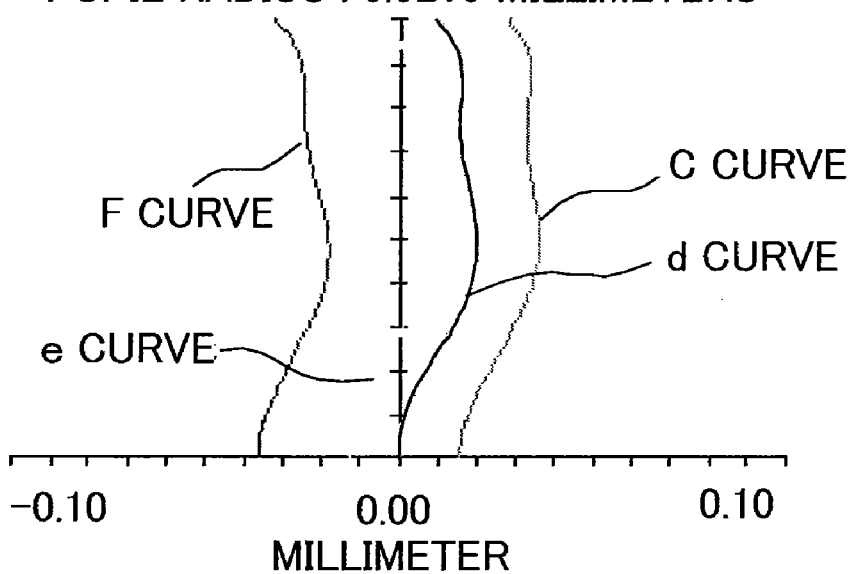

Aberrations of the imaging lens CL2 are illustrated in FIGS. 4A through 4C.

FIG. 4A is a graph of astigmatism of the imaging lens CL2, with symbol definitions identical to those of FIG. 3A.

FIG. 4B is a graph of distortion (%) of the imaging lens CL2 at the d curve wavelength.

FIG. 4C is a graph of spherical aberration of the imaging lens CL2, with symbol definitions identical to those of FIG. 3C.

Figure 5:
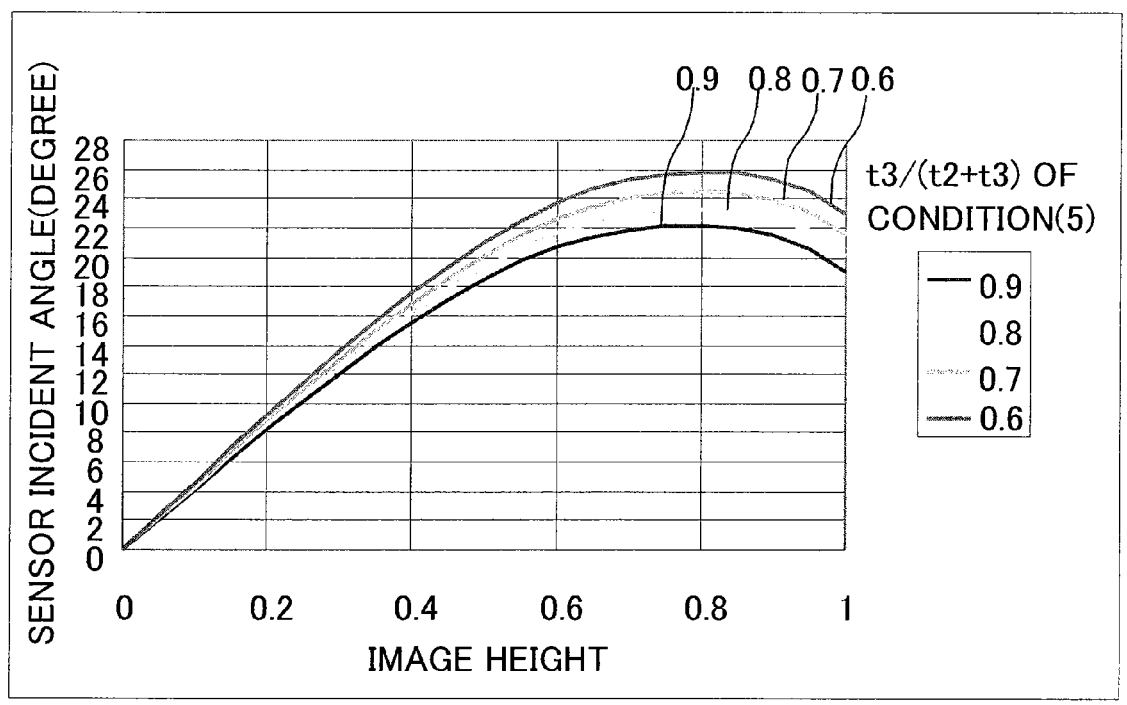
FIG. 5 illustrates relationships between image height and sensor incident angle for the imaging lens according to the second exemplary embodiment, with various values of condition (5).

FIG. 5 is a graph of curves illustrating relationships between image height and sensor incident angle for the imaging lens CL2, with t3/(t2+t3) in condition (5) equal to values of 0.6, 0.7, 0.8, and 0.9.

Generally, it is favorable that light approaches an image sensor at an incident angle of 24 degrees or less in the case of sensor cell pitches of about 2.2 to 2.8 μm. FIG. 5 illustrates that an aperture stop S disposed in accordance with condition (5), i.e., 0.8≦t3/(t2+t3), will provide an incident angle of light to the image sensor of 24 degrees or less, regardless of image height.

$\alpha_{12}$, are presented in Table 7. The definitions of terms in Table 6 and Table 7 are the same as those in Table 2 and Table 3.

TABLE 6

| No. | Curvature Radius r | Distance d | Refractive Index nd | Abbe Number vd | Description |
|---|---|---|---|---|---|
| 0 | 0 | Infinity | | | |
| 1 | 1.2996 | 0.566 | 1.53115 | 56.0 | first lens |
| 2 | 4.1287 | 0.089 | | | |
| 3 | 0 | 0.684 | | | aperture |
| 4 | −0.6856 | 0.5 | 1.53115 | 56.0 | second lens |
| 5 | −0.7165 | 0.05 | | | |
| 6 | 3.7402 | 1.02 | 1.53115 | 56.0 | third lens |
| 7 | 2.3550 | 0.5 | | | |
| 8 | 0 | 0.21 | 1.5168 | 64.2 | filter |
| 9 | 0 | 0.523 | | | |

TABLE 7

| No. | k | α4 | α6 | α8 | α10 | α12 |
|---|---|---|---|---|---|---|
| 1 | −0.321641671 | 0.019097874 | 0.105187067 | −0.365203735 | 0.662317131 | −0.480016954 |
| 2 | 48.31222223 | −0.018860323 | −1.114824549 | 5.199353825 | −13.5674891 | 6.207315211 |
| 4 | −5.275313109 | −1.909050225 | 3.103248952 | −4.822505271 | 0.907632931 | 5.971289088 |
| 5 | −0.471130805 | −0.06549842 | 0.138286132 | 0.069439663 | 0.020885035 | 0.460527642 |
| 6 | −133.5881003 | 0.009966211 | 0.004927838 | −0.002830596 | 0.000387743 | −2.81799E−05 |
| 7 | −50 | −0.069563176 | 0.010500285 | −0.000153977 | −5.79976E−06 | −4.04022E−05 |

COMPARISON EXAMPLES

Now, for comparison with the imaging lenses of the present invention, imaging lenses that do not satisfy condition (1) are illustrated.

First Comparison Example

Figure 6:
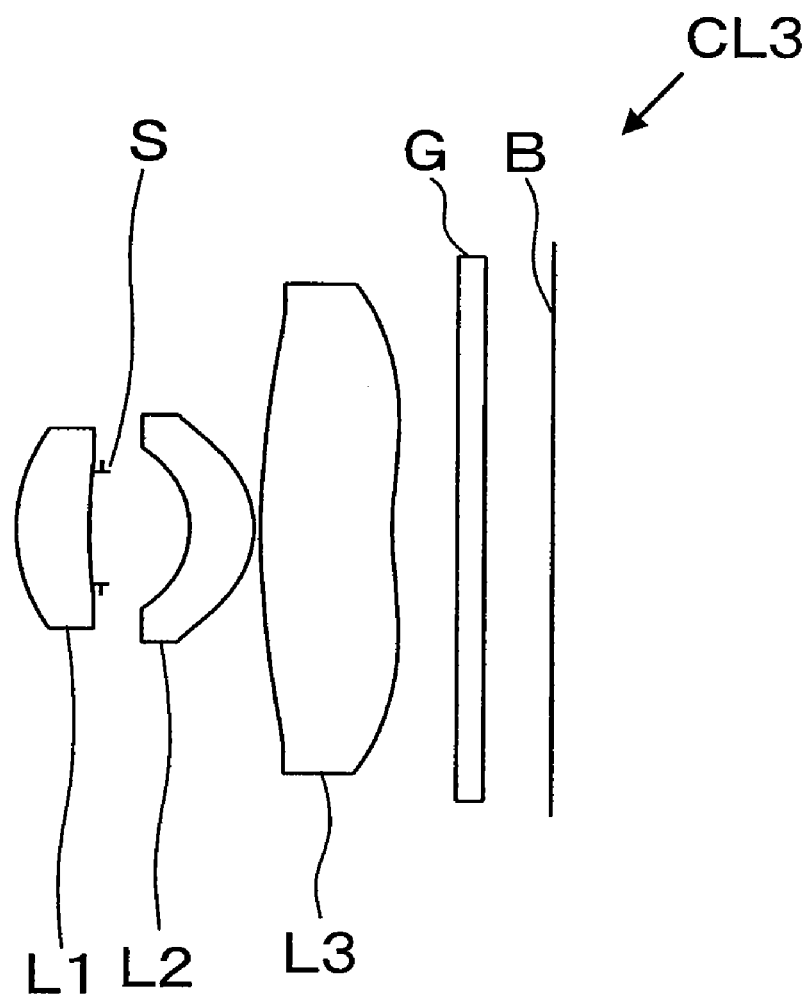
FIG. 6 illustrates a lens configuration of an imaging lens according to a first comparative example, having a T0 value below the lower limit in condition (1).

FIG. 6 illustrates the configuration of the imaging lens CL3 according to a first comparison example of the present invention. The basic configuration of the imaging lens CL3 is similar to those of the imaging lenses CL1 and CL2 according to the first exemplary embodiment and the second exemplary embodiment, respectively. However, the imaging lens CL3 has a value of T0=0.44H, below the lower limit of condition (1). The focal distance f of the entire compound imaging lens CL3 is 3.035 mm, the F-number is f/2.9, and the angle of view 2ω is 72.9°.

The data defining lens elements of the imaging lens CL3 is presented in Table 6. The parameters defining a first lens L1 through a third lens L3 of the imaging lens CL3, i.e., a conic constant k and asphericity coefficients $\alpha_4$, $\alpha_6$, $\alpha_8$, $\alpha_{10}$, and Astigmatism of the imaging lens CL3 is illustrated in FIG. 7A. Distortion of the imaging lens CL3 is illustrated in FIG. 7B. A value of T0 below the lower limit of condition (1) results in larger astigmatism and distortion, as illustrated by comparing FIG. 7A to FIGS. 3A and 4A, and FIG. 7B to FIGS. 3B and 4B, respectively.

Second Comparison Example

Figure 8:
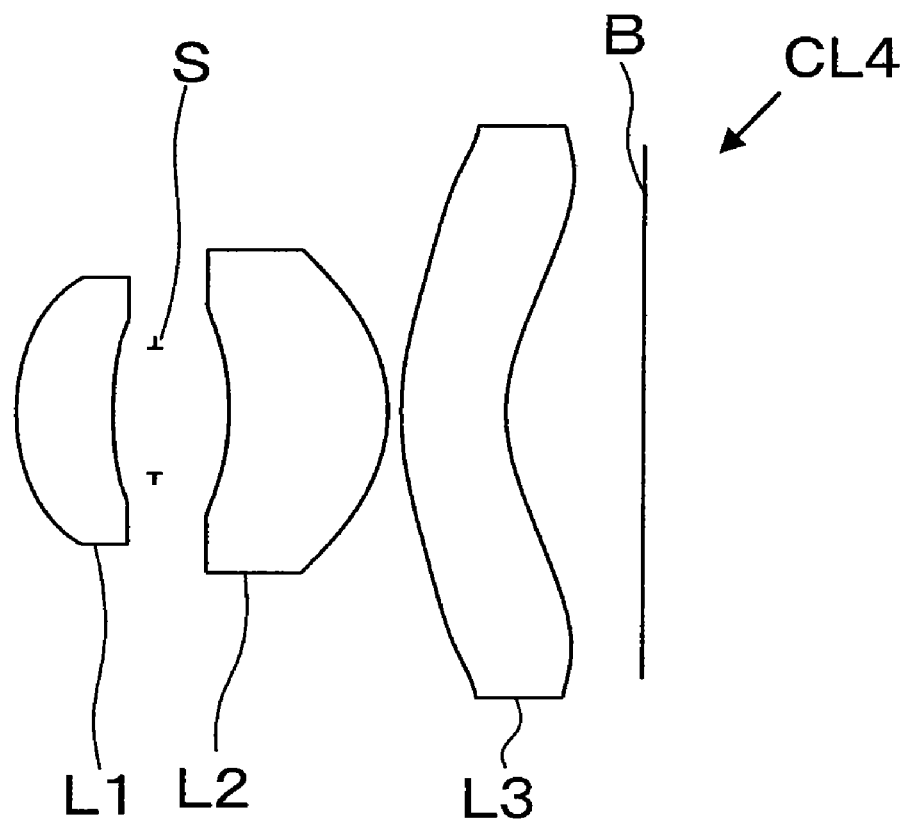
FIG. 8 illustrates a lens configuration of an imaging lens according to a second comparative example, having a T0 value above the upper limit in condition (1).

FIG. 8 illustrates the configuration of an imaging lens CL4 according to a second comparison example of the present invention. The basic configuration of the imaging lens CL4 is similar to those of the imaging lenses CL1 and CL2 according to the first exemplary embodiment and the second exemplary embodiment, respectively. However, the imaging lens CL4 has a value of T0=0.96H, above the upper limit of condition (1). The focal distance f of the entire compound imaging lens CL4 is 1.004 mm, the F-number is f/2.4, and the angle of view 2ω is 60.7°.

The data defining lens elements of the imaging lens CL4 is presented in Table 8. The parameters defining a first lens L1 through a third lens L3 of the imaging lens CL4, i.e., a conic constant k and asphericity coefficients $\alpha_4$, $\alpha_6$, $\alpha_8$, $\alpha_{10}$, and $\alpha_{12}$, are presented in Table 9. The definitions of terms in Table 8 and Table 9 are the same as those in Table 2 and Table 3.

TABLE 8

| No. | Curvature Radius r | Distance d | Refractive Index nd | Abbe Number vd | Description |
|---|---|---|---|---|---|
| 0 | 0 | 67.132 | | | |
| 1 | 0.4963 | 0.237 | 1.56865 | 58.7 | first lens |
| 2 | 1.0069 | 0.105 | | | |
| 3 | 0 | 0.180 | | | aperture |
| 4 | −0.5958 | 0.391 | 1.56865 | 58.7 | second lens |
| 5 | −0.379 | 0.033 | | | |
| 6 | 0.711 | 0.261 | 1.50869 | 56 | third lens |
| 7 | 0.4115 | 0.339 | | | |

TABLE 9

| No. | k | α4 | α6 | α8 | α10 | α12 |
|---|---|---|---|---|---|---|
| 1 | 1.035497 | 0.1416509 | −5.419014 | 93.63338 | −361.8564 | 0 |
| 2 | 1.712492 | 3.067998 | 20.97959 | 334.2231 | 663.659 | 0 |
| 4 | −12.6695 | −6.880247 | 28.9412 | 222.9366 | 1034.822 | 0 |
| 5 | −0.224994 | 1.270864 | 23.36903 | −282.1096 | 1424.845 | 0 |
| 6 | −10.204 | 0.9671391 | −9.04655 | 28.77982 | −28.48722 | 0 |
| 7 | −0.856 | −4.705132 | 14.30551 | −31.21113 | 25.29566 | 0 |

Figure 9A:
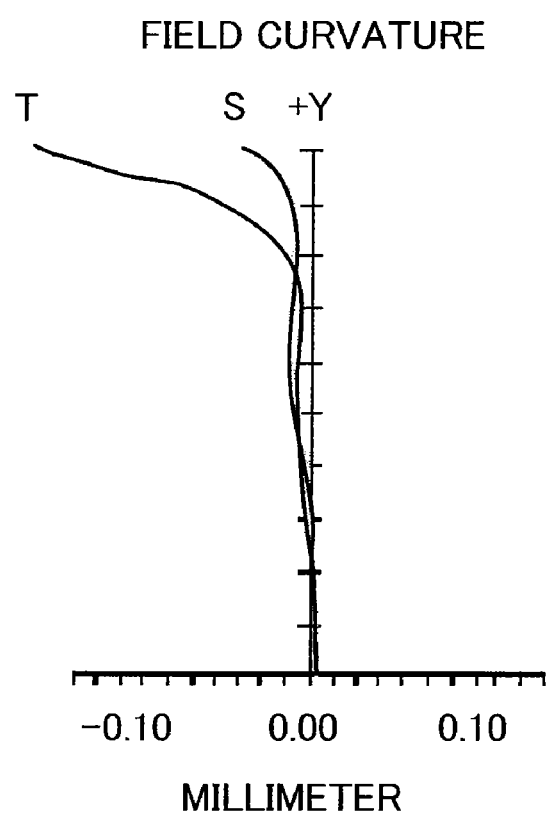
FIGS. 9A and 9B illustrate various aberrations of the imaging lens according to the second comparative example, having a T0 value above the upper limit in condition (1).
Figure 9B:
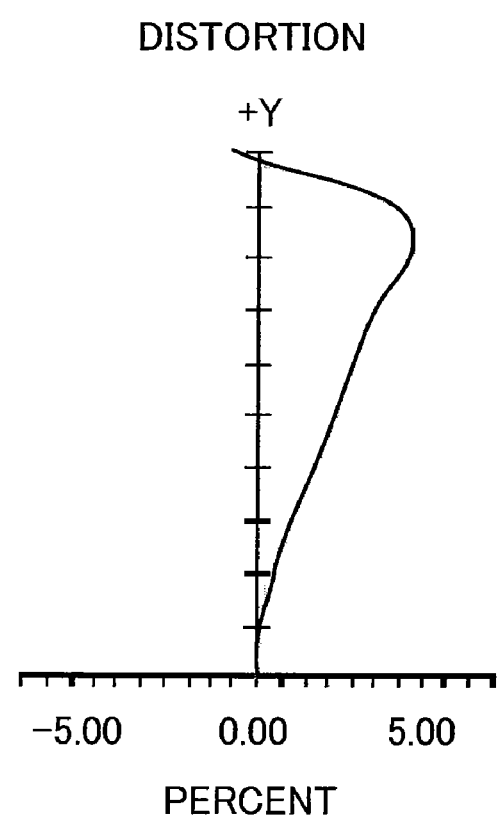

FIG. 9A illustrates astigmatism of the imaging lens CL4. FIG. 9B illustrates distortion of the imaging lens CL4. A value of T0 above the upper limit of condition (1) results in larger astigmatism and distortion, as illustrated by comparing FIG. 9A to FIGS. 3A and 4A, and FIG. 9B to FIGS. 3B and 4B, respectively.

As described above, the present invention enables a compact imaging lens CL, while sufficiently compensating for various aberrations.

The data defining the lens elements and shapes used in the imaging lenses CL1 and CL2 according to the first exemplary embodiment and the second exemplary embodiment, respectively, are merely illustrations. It is to be understood that other values satisfying the necessary conditions of the present invention may be used.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on and claims priority to Japanese Patent Application No. 2007-118433, filed on Apr. 27, 2007 and including specification, claims, drawings and summary. The disclosure of the above Japanese Patent Application is incorporated herein by reference in its entirety.

What is claimed is:

1. A compound imaging lens comprising:
a first lens, a second lens, and a third lens disposed sequentially in this order, the first lens disposed toward an object, and the third lens disposed toward an image surface; wherein
the first lens has a meniscus shape, a positive refraction, and a convex surface, the convex surface facing the object;
the second lens has a meniscus shape, a positive refraction, and a concave surface, the concave surface facing the object;
the third lens has a convex-type shape facing the object, and a concave-type aspherical shape facing the image surface, the concave-type aspherical shape configured to provide a negative refraction in a radially central portion and a positive refraction in a radially peripheral portion; and three conditions:

$$0.5H < T0 < 0.7H \quad (1)$$

$$2 < \phi r4/\phi < 2.5 \quad (2)$$

and $$0.15 < \phi r5/\phi < 0.3 \quad (3)$$

are satisfied, where
H is defined as an effective radius of the surface of the third lens facing the image surface,
T0 is defined as a distance between a point on a normal line and an optical axis, the normal line being parallel to the optical axis and normal to the surface of the third lens facing the image surface,
$\phi$ is defined as a combined refractive power of the first lens, the second lens, and the third lens,
$\phi r4$ is defined as a refractive power of a surface of the second lens facing the image surface, and
$\phi r5$ is defined as a refractive power of the surface of the third lens facing the object.

2. The imaging lens according to claim 1, further comprising an aperture stop disposed between the first lens and the second lens.

3. The imaging lens according to claim 2, wherein two conditions:

$$0.8 < \phi 1/\phi < 1 \quad (4)$$

and $$0.8 \leq t3/(t2+t3) \quad (5)$$

are satisfied, where
$\phi 1$ is defined as a refractive power of the first lens,
t2 is defined as a distance between the first lens and the aperture stop, and
t3 is defined as a distance between the aperture stop and the second lens.

* * * * *